United States Patent [19]
Rohra

[11] Patent Number: 5,015,150
[45] Date of Patent: May 14, 1991

[54] ARRANGEMENT FOR MOUNTING A PIVOTABLE PROPFAN BLADE

[75] Inventor: Alois Rohra, Muchen, Fed. Rep. of Germany

[73] Assignee: MTU Munchen GmbH, Fed. Rep. of Germany

[21] Appl. No.: 363,534

[22] Filed: May 31, 1989

[30] Foreign Application Priority Data

May 31, 1988 [DE] Fed. Rep. of Germany ....... 3818466

[51] Int. Cl.[5] .............................................. F01D 5/30
[52] U.S. Cl. ................................ 416/220 R; 416/207; 416/209
[58] Field of Search ................ 416/147, 205, 210, 206, 416/208, 209, 219 R, 220 R, 207

[56] References Cited

U.S. PATENT DOCUMENTS

| | | | |
|---|---|---|---|
| 1,876,609 | 9/1932 | Carter | 416/61 |
| 1,927,592 | 9/1933 | Lambert | 416/205 |
| 2,665,054 | 1/1954 | Fischer | 416/207 X |
| 4,019,832 | 4/1977 | Salemme et al. | 416/219 R X |
| 4,047,840 | 9/1977 | Ravenhall et al. | 416/135 |
| 4,738,591 | 4/1988 | Butler | 416/171 X |
| 4,762,466 | 8/1988 | Bouiller et al. | 416/147 X |
| 4,784,575 | 11/1988 | Nelson et al. | 416/226 |
| 4,810,167 | 3/1989 | Spoltman et al. | 416/229 A |

FOREIGN PATENT DOCUMENTS

| | | | |
|---|---|---|---|
| 2333274 | 1/1974 | Fed. Rep. of Germany. | |
| 2622235 | 8/1987 | Fed. Rep. of Germany. | |
| 99774 | 9/1940 | Sweden | 416/209 |
| 485978 | 5/1938 | United Kingdom | 416/207 |
| 546621 | 7/1942 | United Kingdom | 416/209 |
| 637238 | 5/1950 | United Kingdom | 416/209 |
| 2174762 | 11/1986 | United Kingdom | 416/171 |
| 2192943 | 1/1988 | United Kingdom | 416/129 R |

Primary Examiner—John T. Kwon
Attorney, Agent, or Firm—Evenson, Wands, Edwards, Lenahan & McKeown

[57] ABSTRACT

In an arrangement for mounting a shrouded pivotable propfan blade at a rotor, the propfan blade is held in a dovetail mounting of a blade carrier and, by using a first securing device is fixed with respect to axial movements of the propfan blade. The blade carrier is secured with respect to radial movements by means of a second securing device, which is accessible from the outside. This permits a simple and fast mounting and demounting of the propfan blades.

19 Claims, 3 Drawing Sheets

ARRANGEMENT FOR MOUNTING A PIVOTABLE PROPFAN BLADE

BACKGROUND AND SUMMARY OF THE INVENTION

The invention relates to an arrangement for mounting a shrouded pivotable propfan blade at a rotor, in which the propfan blade is fastened at a blade carrier and this blade carrier, by means of a roller bearing, is disposed in the rotor so that it can be adjustably pivoted around an axis which is radial with respect to the engine.

This type of an arrangement is known from German Published Unexamined patent application (DE-OS) No. 23 33 274, in which the propfan blade must be removed radially toward the outside.

From German Patent (DE-PS) No. 26 22 235, an arrangement is known for the swivelling of propfan blades of a turbo engine, in which, in each case, one shaft of a propfan blade is rotatably disposed in a rotor. At the shaft, a toothed wheel is fastened, which is arranged radially on the inside and engages with toothed rings disposed in the rotor for the purpose of swivelling the propfan blade.

These arrangements have the disadvantage that, if one blade is damaged, their removal is very costly. Thus, in the case of the latter, the toothed wheel located on the inside must be removed first before the blade can be pulled off radially toward the outside. Particularly, in propfan engines having a shroud radially outside the propfan blades, an opening in the shroud must be provided for this purpose. This requires higher mounting expenditures and increases the risk of damage to the shroud.

Starting from these conditions, it is an object of the invention to provide a mounting for a pivotable propfan blade which ensures a simple removal or exchange of the propfan blade also when a shroud is present. In particular, no intervention is to be required for this purpose on the inside of the rotor or in the swivelling mechanism.

This object is achieved in accordance with certain preferred embodiments of the invention by providing an arrangement for mounting a shrouded pivotable propfan blade at a rotor, in which the propfan blade is fastened at a blade carrier and this blade carrier, by means of a roller bearing, is disposed in the rotor so that it can be pivoted around an axis which is radial with respect to the engine, characterized that the propfan blade is held in a dovetail mounting in the blade carrier and, by means of a first securing device is fixed with respect to axial movements of the propfan blade and the blade carrier is secured by means of a second securing device accessible from the outside with respect to radial movements.

This object is achieved according to certain other preferred embodiments of the invention by providing an arrangement for mounting a shrouded pivotable propfan blade at a rotor, in which the propfan blade is fastened at a blade carrier and this blade carrier, by means of a roller bearing, is disposed in the rotor so that it can be pivoted around an axis which is radial with respect to the engine, characterized that the propfan blade has a disk-shaped blade base which, by means of a divided clamping ring is releasably fastened in the fitted disk-shaped upper part of the blade carrier and is secured by means of a securing device 8 which is accessible from the outside with respect to radial movements.

As a result of the arrangements of the present invention it can be advantageously achieved that a propfan blade, which is to be exchanged, must not be removed radially toward the outside, and thus no changes are required at the shroud. The removal of the propfan blade advantageously takes place by the fact that, after the removal of the first safety device, the blade can be removed axially out of the dovetail guide and, if necessary, the blade carrier can then, after the removal of the second safety device, be pulled out radially.

A removal of the profan blade or of the blade carrier or its bearing is possible without any intervention in the blade adjusting mechanism and the pertaining hydraulic system. As a result, a significant shortening and simplification of the repair process of the blade or the blade bearing can be achieved.

In an advantageous further development of the invention, the blade carrier is connected by means of a toothing with the pivoted adjusting lever in a non-rotatable manner. This permits a space-saving releasable connection which can be disengaged in a simple way. The toothing may be constructed either as a simple radial toothing or a wedge-type toothing.

Another advantageous development of certain preferred embodiments of the invention provides that a sleeve-type intermediate member is connected with the blade carrier by way of fastening, i.e., the fixing of the inner ring of the bearing by means of a thread, and has a toothing at its inner surface. As a result, a favorable fixing of the ring bearing can be advantageously combined with the possibility of a simple radial removal of the blade carrier.

In addition, it is provided in certain preferred embodiments that a tensioning nut, which is accessible from the outside while clamping in an outer ring of the bearing by means of a thread, is connected with the rotor. This permits a simple detachment of the blade carrier without any interventions into the pivot bearing or the interior of the rotor.

The blade carrier is preferably disposed by means of a double-row tapered roller bearing, whereby a favorable absorption can be achieved of the stress which occurs during the operation.

The dovetail mounting is preferably sloped with respect to the rotor axis. As a result, when a propfan blade is removed, an enlargement of the tip gap can be achieved which reduces the danger of damage to the blade tip or provided grazing coatings in the shroud.

A further development of the invention provides that one or several securing plates are provided for the axial securing of the propfan blades, these securing plates being fitted radially from the inside, into transverse grooves of the blade carrier and a dovetail-type constructed blade base, and being secured by means of a securing wedge which is slid axially under the blade base. As a result, a simple releasable axial fixing of the propfan blade can be achieved which is also low in weight.

In an advantageous further development of preferred embodiments, the dovetail mounting is constructed to be arcuate, ensuring a favorable fit with respect to the profile shape of the propfan blade.

According to an alternative solution of the problems on which the invention is based, the propfan blade is mounted at the blade carrier by means of clamping-ring segments. This permits a simple mounting and demounting of the propfan blade. Preferably, the clamping ring, which has a U-shaped cross-section, consists of two half-rings, which are fitted together under tension by means of connecting flanges. It is also contemplated to separate the clamping ring only at one point, so that the demounting takes place by the elastic bending-open of the clamping ring.

Other objects, advantages and novel features of the present invention will become apparent from the following detailed description of the invention when considered in conjunction with the accompanying drawings.

DETAILED DESCRIPTION OF THE DRAWINGS

Figure 1:
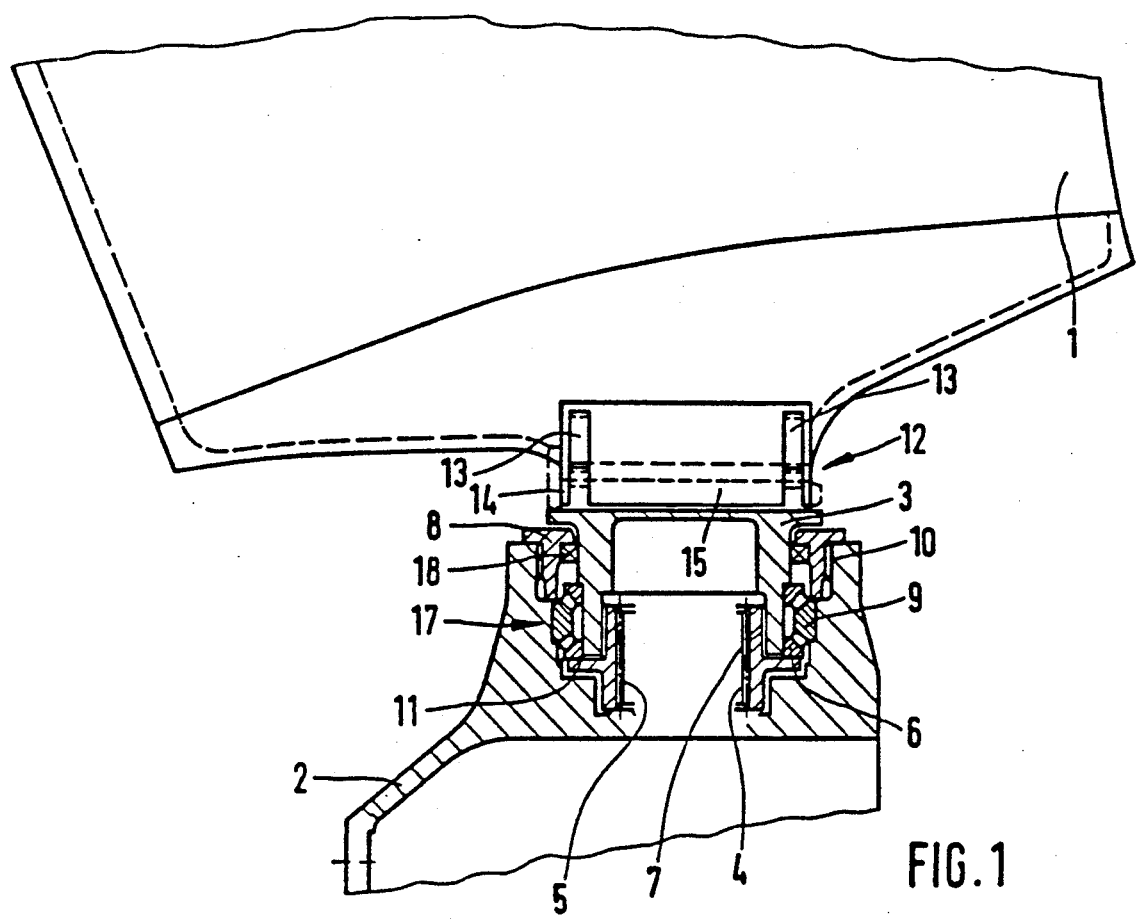
FIG. 1 is an axial sectional view of a propfan blade mounting constructed in accordance with a preferred embodiment of the invention.

The propfan blade 1 shown in FIG. 1, is mounted by means of a dovetail mounting 12, at a rotationally symmetrical blade carrier 3. The fixing in the direction which is axial with respect to the engine takes place in this case by means of two securing plates 13 which are housed in radial grooves of the blade base 14. These securing plates 13 are, in turn, held in position by means of a securing wedge 15 to be inserted axially under the blade base 14.

The blade carrier 13 is rotatably disposed in the rotor 2 by means of a double-row tapered roller bearing 17. In this case, the outer ring 9 of the tapered roller bearing 17 is braced in the rotor 2 by means of the tensioning nut 8. The tensioning nut 8 is accessible from the outside and is fastened at the rotor 2 by means of the thread 10. Between the tensioning nut 8 and the blade carrier 3, a seal 18 is also provided for the sealing-off of the bearing 17 toward the outside.

Figure 2:
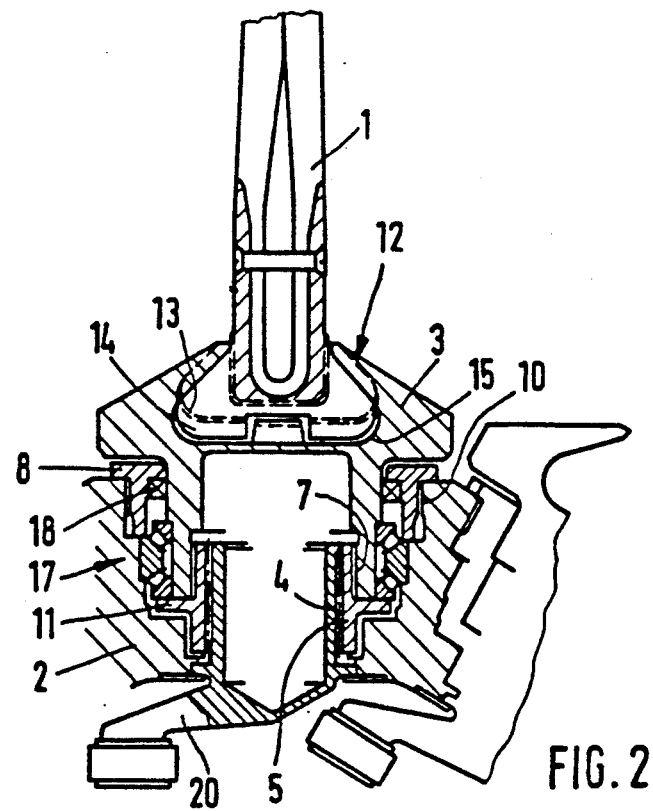
FIG. 2 is a cross-sectional view of the arrangement according to FIG. 1.

The divided inner ring 6 of the bearing 17 is braced in the blade carrier 3 by means of the intermediate member 5. The sleeve-type intermediate member 5 which, by means of a thread 7 is screwed into the blade carrier 3, has a toothing 4 at its inner circumferential surface, a corresponding toothing of a pivoted adjusting lever 20 being fitted into this toothing 4, as shown in FIG. 2.

For the bracing of the inner ring 6 of the blade, an outer-ring flange 11 is provided at the intermediate member 5.

Figure 3:
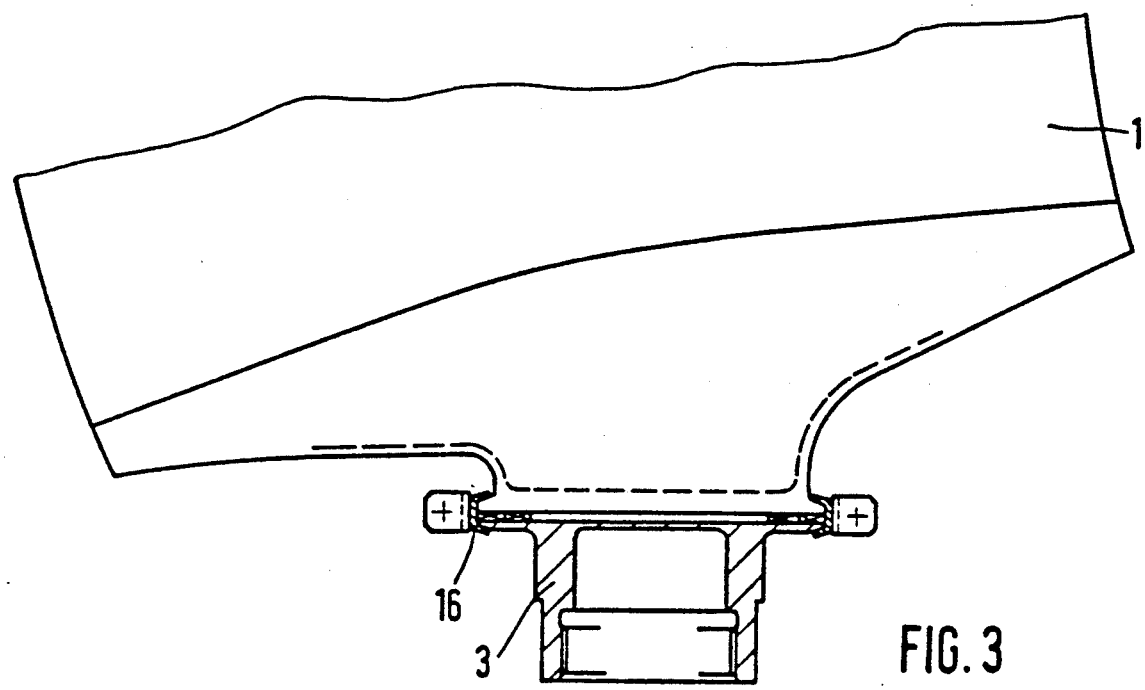
FIG. 3 is an axial sectional view of another preferred embodiment of a propfan blade mounting construction in accordance with the present invention.
Figure 4:
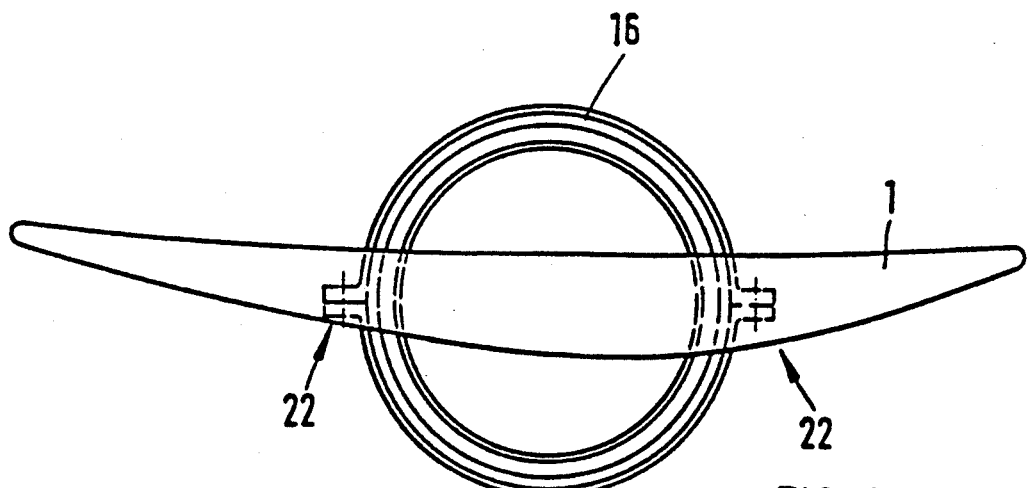
FIG. 4 is a top view of a propfan blade constructed in accordance with a preferred embodiment of the invention.

An alternative mounting possibility of the propfan blade 1 at the blade carrier 3 is shown in FIG. 3. For this purpose, a clamping ring 16 is provided which consists of two ring segments and which is screwed together and braced at two opposite points 22, as shown in FIG. 4.

For the demounting of the propfan blade 1, according to the embodiment shown in FIG. 1, the securing wedge 15 is first pulled out from under the blade base in axial direction. Then, the securing plates 13 will slide radially toward the inside, and thus take on the same circumferential contour as the dovetail-type blade base 14. Then, the blade base 14 will be pulled out of the blade carrier 3 in axial direction. If a removal of the blade carrier is required, the tensioning nut 8, which is accessible from the outside, is unscrewed. Then the blade carrier 3 can be pulled out upwards in radial direction, in which case the bearing 17 remains fastened to the blade carrier 3.

Figure 5:
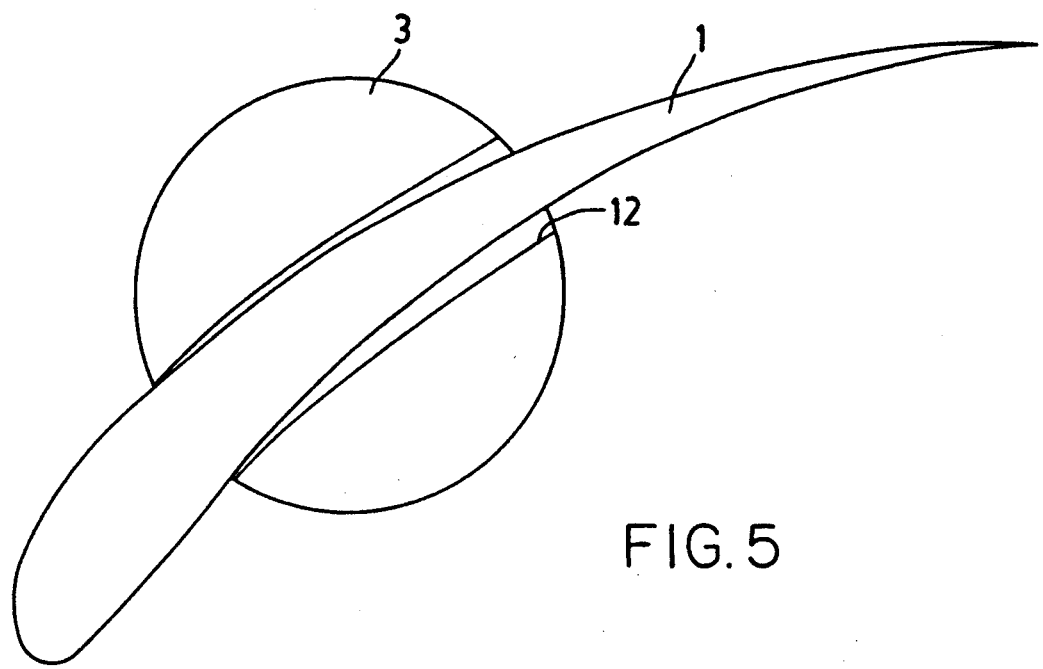
FIG. 5 is a top view of another propfan blade constructed in accordance with a preferred embodiment of the invention.

In FIG. 5, a propfan blade 1 is shown in radial view from the top, which shows that the dovetail mounting 12 for the fastening of the propfan blade 1 at the blade carrier 3, is constructed to be arcuate and matches the bend of the blade.

Although the present invention has been described and illustrated in detail, it is to be clearly understood that the same is by way of illustration and example only, and is not to be taken by way of limitation. The spirit and scope of the present invention are to be limited only by the terms of the appended claims.

I claim:

1. An arrangement for mounting a shrouded pivotable propfan blade at a rotor of an engine, in which the propfan blade is fastened at a blade carrier and this blade carrier, by means of a roller bearing, is disposed in the rotor so that it can be adjustably pivoted around an axis which is radial with respect to the engine, wherein the propfan blade has a disk-shaped blade base which is releasably fastened by means of a divided clamping ring in a fitted disk-shaped upper part of the blade carrier, wherein the blade carrier is secured with respect to radial movements by means of a securing device which is accessible from the outside, and wherein the blade base and clamping ring are configured to accommodate exchange of a fan blade at the blade carrier in the axial direction of the rotor without substantial radial movements of the blade and without removal of the blade carrier from the rotor.

2. An arrangement for mounting a shrouded pivotable propfan blade at a rotor of an engine, in which the propfan blade is fastened at a blade carrier and this blade carrier, by means of a roller bearing, is disposed in the rotor so that it can be adjustably pivoted around an axis which is radial with respect to the engine, wherein the propfan blade is releasably fastened at the blade carrier by fastening means permitting removal of the blade in the axial direction of the rotor without requiring access through or movement of the surrounding shroud, wherein the blade carrier is secured to the rotor by securing means permitting removal of the blade carrier in the radial direction without requiring access through or movement of the shroud, after removal of the blade.

3. An arrangement for detachably mounting a shrouded propfan blade at an engine rotor, comprising:
   a blade carrier rotatably mounted at a rotor to be adjustably rotated about a blade carrier adjusting axis extending transversely of a rotor rotational axis,
   and detachable blade monting means for detachably mounting a propfan blade at the blade carrier, said blade mounting means including means accommodating exchange of a fan blade at the blade carrier in the axial direction of the rotor without substantial radial movements of the blade and without removal of the blade carrier from the rotor.

4. An arrangement according to claim 3, comprising detachable carrier mounting means for detachably mounting the carrier at the rotor, said carrier mounting means being separate from the blade mounting means.

5. An arrangement according to claim 4, wherein said carrier mounting means includes means accessible from radially outside the rotor for detaching the carrier from the rotor with subsequent removal of the carrier in a radial direction of the rotor.

6. An arrangement according to claim 4, wherein the carrier mounting means includes roller bearing means.

7. An arrangement according to claim 6, wherein the roller bearing means includes a double-row tapered roller bearing.

8. An arrangement according to claim 7, wherein a sleeve-type intermediate member is connected with the blade carrier and functions to fix an inner ring of the roller bearing means.

9. An arrangement according to claim 8, wherein the intermediate member is equipped with an outer-ring flange which braces the inner ring of the bearing with respect to the blade carrier.

10. An arrangement according to claim 3, wherein the blade carrier is non-rotatably connected with a pivoted adjusting lever by means of a toothing.

11. An arrangement according to claim 10, wherein the toothing is a wedge-type toothing.

12. An arrangement according to claim 10, wherein the blade carrier is mounted at the rotor by roller bearing means, and wherein a sleeve-type intermediate member is connected with the blade carrier and functions to fix an inner ring of the roller bearing means.

13. An arrangement according to claim 12, wherein said intermediate member is connected with the blade carrier by a threaded connection, and wherein said toothing is formed on an inner surface of the intermediate member.

14. An arrangement according to claim 12, wherein the intermediate member is equipped with an outer-ring flange which braces the inner ring of the bearing with respect to the blade carrier.

15. An arrangement according to claim 3, wherein said blade mounting means includes: interengageable dovetail means at the blade and blade carrier, and detachable clamping means movable radially between a blade clamping position preventing movement of the blade in a direction parallel to the rotor axis and an unclamping position permitting movement of the blade in a direction parallel to the rotor axis.

16. An arrangement according to claim 15, wherein the dovetail means is sloped with respect to the rotor axis.

17. An arrangement according to claim 16, wherein the dovetail mounting is constructed to be arcuate in order to match the contour of the blade profile.

18. An arrangement according to claim 15, wherein said detachable clamping means include securing plates for axial securing of the blade, these securing plates being fitted radially from the inside, into transverse grooves of the blade carrier and of a dovetail-type constructed blade base and being secured by means of a securing wedge pushed axially under the blade base.

19. An arrangement according to claim 15, wherein the dovetail mounting is constructed to be arcuate in order to match the contour of the blade profile.

* * * * *